(12) United States Patent
Sugita et al.

(10) Patent No.: US 8,440,744 B2
(45) Date of Patent: May 14, 2013

(54) OIL-BASED WHITE INK JET RECORDING COMPOSITION AND PROCESS FOR PRODUCING THE SAME

(75) Inventors: Yukio Sugita, Yokohama (JP); Mitsuyoshi Tamura, Yokohama (JP); Mitsuteru Yamada, Yokohama (JP); Fumie Yamazaki, Yokohama (JP); Tamayo Okahira, Yokohama (JP)

(73) Assignee: The Inctec Inc., Yokohama-Shi (JP)

( * ) Notice: Subject to any disclaimer, the term of this patent is extended or adjusted under 35 U.S.C. 154(b) by 590 days.

(21) Appl. No.: 12/593,108

(22) PCT Filed: Mar. 26, 2008

(86) PCT No.: PCT/JP2008/055663
§ 371 (c)(1),
(2), (4) Date: Sep. 25, 2009

(87) PCT Pub. No.: WO2008/126675
PCT Pub. Date: Oct. 23, 2008

(65) Prior Publication Data
US 2010/0105807 A1  Apr. 29, 2010

(30) Foreign Application Priority Data

Mar. 29, 2007 (JP) .................... 2007-088871
Mar. 29, 2007 (JP) .................... 2007-088901

(51) Int. Cl.
*A61Q 19/00* (2006.01)
*B01F 17/00* (2006.01)
*B60C 1/00* (2006.01)
*C08J 3/00* (2006.01)
*C08K 3/10* (2006.01)
*C08K 3/18* (2006.01)

(52) U.S. Cl.
USPC ........... 523/160; 523/161; 523/200; 523/205; 523/212; 523/216; 524/261; 524/267; 524/413; 524/430; 524/431

(58) Field of Classification Search .................. 523/160, 523/161, 200, 205, 212, 216; 524/261, 267, 524/413, 430, 431, 502, 560, 497; 525/88, 525/95
See application file for complete search history.

(56) References Cited

U.S. PATENT DOCUMENTS

| | | | |
|---|---|---|---|
| 6,632,531 B2 * | 10/2003 | Blankenship | 428/402 |
| 7,125,447 B2 | 10/2006 | Sugita et al. | |
| 2007/0167538 A1 | 7/2007 | Mochizuki et al. | |
| 2008/0194754 A1 | 8/2008 | Nakamura et al. | |

FOREIGN PATENT DOCUMENTS

| | | |
|---|---|---|
| EP | 1 777 270 A1 | 4/2007 |
| JP | 06-107964 A1 | 4/1994 |
| JP | 2004-263181 A1 | 9/2004 |
| JP | 2005-200469 A1 | 7/2005 |
| JP | 2007-169492 A1 | 7/2007 |
| WO | 2004/007626 A1 | 1/2004 |
| WO | 2006/016674 A1 | 2/2006 |
| WO | WO 2006/016674 * | 2/2006 |

* cited by examiner

*Primary Examiner* — Patrick Niland
(74) *Attorney, Agent, or Firm* — Burr & Brown

(57) ABSTRACT

The present invention is proposed is an oil-based white ink composition for ink jet recording, comprising a white pigment, a glycol ether dialkyl ether compound solvent, a polymeric dispersant, and a specific acrylic resin. The white pigment is formed of titanium oxide fine particles having an average particle diameter of not less than 0.15 μm and not more than 0.25 μm and coated with at least one of aluminum oxide and silicon oxide. The white pigment is further coated with not less than 0.01% by mass and not more than 2.5% by mass of at least one of an SiH-containing polysiloxane and dimethylpolysiloxane.

10 Claims, No Drawings

OIL-BASED WHITE INK JET RECORDING COMPOSITION AND PROCESS FOR PRODUCING THE SAME

FIELD OF THE INVENTION

The present invention (first and second aspects) relates to an oil-based white for ink jet recording ink (oil-based white ink jet recording ink) that has excellent storage stability, is highly stable over time, has a high capability of opacifying a substrate in a printed matter, and can be highly stably ejection onto the substrate in the printed matter.

BACKGROUND ART OF THE INVENTION

An ink jet recording method has hitherto been used as a recording method that ejects ink droplets through a print head or a spray nozzle at a high speed toward a recording material in response to electric signals sent from a computer or the like to perform printing on an ink-receptive layer in the recording material. By virtue of small noise and high-speed printing, the ink jet recording method has become widely spread, for example, in the fields of copying, facsimile, poster, and display. Properties required of inks used in the ink jet recording method include no change in properties with the elapse of time, stable retention of satisfactory density of an image formed using the ink for a long period of time, and excellent original reproduction of an image printed on a recording material.

To satisfy these property requirements, the ink used should not clog a head nozzle and a filter provided between an ink cartridge and the head. Therefore, for the ink, ink properties such as density, viscosity, particle diameter, and concentration should be regulated. The ink is generally prepared by mixing a colorant such as a dye or a pigment with a dispersant for dispersing the colorant, a solvent and optionally an additive.

In particular, when a white ink for ink jet recording is printed on a black or transparent recording material having low brightness, a highly visible printed matter can be provided. The white ink is also effective for marking of various products. When a color ink other than the white ink is printed on the recording material, sharp printing cannot be reproduced due to the influence of a color of a substrate. In order to overcome this problem, a method is adopted in which, after printing, underlying printing is performed with a white ink having a satisfactory substrate opacifying property to opacify the substrate in its area remaining unprinted, and other color ink is then printed on the white background. The white ink generally uses a titanium oxide pigment as a colorant. The conventional white ink using a titanium oxide pigment causes sedimentation/coagulation of the titanium oxide pigment with the elapse of time during storage due to, for example, the specific gravity of pigment particles and a solvent used, particularly when an alcohol solvent is used, often resulting in lowered redispersibility of the titanium oxide pigment.

In order to solve the above problems of the prior art, Japanese Patent Application Laid-Open No. 107964/1994 (patent document 1) proposes a white pigment composition into which a specific compound has been mixed. Specifically, the white pigment composition is produced by dispersing a titanium oxide pigment subjected to only alumina treatment in an alcohol solvent using a carboxyl group-containing acrylic resin as a dispersant. The white pigment composition disclosed in patent document 1 has been proposed with a view to improving the redispersibility of the precipitated white pigment and thus is unsuitable in an actual work (an ink jet printing work) where there is a demand for the use of the white pigment composition as such is used without redispersion of the pigment settled in the ink. Further, when the titanium oxide pigment is used as a white pigment, during storage of the ink, the pigment contained in the ink is likely to coagulate and settle. Among others, when the white pigment composition is filled as ink into an ink jet recording apparatus and is not used in this state for a long period of time, the ejection stability of the ink is poor when printing is restarted. Further, in this case, the ink clogs the printer nozzle, and, in the worst case, the printer head should be replaced.

On the other hand, as compared with a low-boiling point solvent which has been commonly used as a solvent for ink compositions, solvents of glycol ether dialkyl ether compounds have a high boiling point and a low vapor pressure, emit no significant odor, are highly safe, and have an excellent work environmental property. The glycol ether dialkyl ether compound solvent, however, has a lower resin solubility than the low-boiling point solvents which have hitherto been used, and, thus, the number of types of commercially available solid resins usable in this case is limited. Accordingly, the use of resins having a high glass transition temperature (Tg) such as methyl methacrylate homopolymers is generally difficult. The use of such acrylic resins poses problems of storage stability and ejection stability of the ink. Further, for acrylic resins of which the solubility has been improved by mixing an acrylic monomer having the effect of increasing the solubility to lower the Tg value and to lower the molecular weight, satisfactory print drying properties cannot be realized without difficulties. Further, when the acrylic resin, the titanium oxide pigment and the dispersant are incompatible with each other in mutual solubility, coagulation sedimentation of the pigment in the ink is likely to proceed during storage of the ink and, consequently, the ink has suffered from problems of storage stability and ejection stability.

Accordingly, at the present time, the development of oil-based white ink compositions for ink jet recording, which are excellent in solubility (dispersibility) between ingredients of the ink composition and long-term storage stability and ejection stability of the ink compositions and can realize good print drying properties, has been urgently demanded.

SUMMARY OF THE INVENTION

At the time of the present invention, the present inventors have found that an oil-based white ink jet recording composition, which is excellent in long-term storage stability, ejection stability, capability of opacifying underlying part of a printed matter, and fast drying properties of the printed matter, can be provided by adopting titanium oxide having a specific average particle diameter, which has been coated with a specific inorganic metal oxide and has a surface coated with a siloxane-type material, as a white pigment and dispersing the titanium oxide in an organic solvent such as a glycol ether dialkyl ether compound solvent. The present invention has been made based on such finding.

FIRST ASPECT OF PRESENT INVENTION

According to a first aspect of the present invention, there is provided an oil-based white ink jet recording composition, comprising, a white pigment;
wherein the white pigment that is formed of titanium oxide fine particles being coated with aluminum oxide and/or silicon oxide wherein the coated titanium oxide fine particles has an average particle diameter of not less than 0.15 μm and not more than 0.25 μm, and the coated titanium oxide fine particles being further coated with not less than 0.01% by mass and not more than 2.5% by mass of an SIH-containing polysiloxane and/or dimethylpolysiloxane;
a glycol ether dialkyl ether compound solvent;
a polymeric dispersant; and
an acrylic resin produced by a solution polymerization using a radical polymerization initiator in a glycol ether dialkyl ether compound solvent or a cyclic ester compound solvent.

SECOND ASPECT OF PRESENT INVENTION

According to a second aspect of the present invention, there is provided an oil-based white ink jet recording composition, comprising,
a white pigment;
wherein the white pigment that is formed of titanium oxide fine particles being coated with aluminum oxide and/or silicon oxide wherein the coated titanium oxide fine particles has an average particle diameter of not less than 0.15 μm and not more than 0.25 μm, and the coated titanium oxide fine particles being further coated with not less than 0.01% by mass and not more than 0.50% by mass of an SiH-containing polysiloxane and/or dimethylpolysiloxane;
a glycol ether dialkyl ether compound solvent;
an acrylic copolymer-containing dispersant; and
an acrylic resin produced by a solution polymerization using a radical polymerization initiator in a glycol ether dialkyl ether compound solvent or a cyclic ester compound solvent.

According to the present invention (first and second aspects), an ink, which can highly maintain an anti-sedimentation property of pigment over time and further can be successfully used for printing in a very short time after standing for a long period of time, can be provided by dispersing a specific white pigment in specific dispersant and solvent and adding a specific resin. Further, the ink according to the present invention can be effectively used as an oil-based white ink for ink jet recording that can provide a printed matter, which can realize a high level of ink whiteness on a printing base material and an excellent capability of opacifying the printing base material, and can provide a highly visible marking on the printing base material.

DETAILED DESCRIPTION OF THE INVENTION

Definition

The following terms as used herein have the following respective meaning.
The expression "oil-based white ink composition for ink jet recording (oil-based white ink jet recording composition)" is sometimes referred to simply as "white ink (composition)" or "ink (composition)."
The term "oxide" refers to an anhydrous oxide, a hydrous oxide, and a mixture of the anhydrous oxide and the hydrous oxide.

First Aspect of Present Invention

I. Oil-Based White Ink Composition for Ink Jet Recording

<White Pigment>

In the present invention, the white pigment is composed mainly of titanium oxide fine particles subjected to the following treatment. The amount of the white pigment added to the ink composition according to the present invention is not less than 0.1% by mass and not more than 24% by mass based on the total amount of the ink composition. Preferably, the lower limit of the addition amount of the white pigment is 1% by mass, and the upper limit of the addition amount of the white pigment is 9% by mass.

Titanium Oxide Fine Particles

Specific examples of titanium oxide constituting the titanium oxide fine particles include rutile-type titanium dioxide and/or anatase-type titanium dioxide. Preferred is rutile-type titanium dioxide.

Oxide Coating (Treatment)

In the present invention, the titanium oxide fine particles are coated with an oxide of aluminum and/or silicon. Specific examples of such oxides include oxides such as $SiO_2$ and $Al_2O_3$ and hydrous oxides such as $SiO_2.nH_2O$ and $Al_2O_3.nH_2O$. Preferred are $Al_2O_3$ and hydrous oxide thereof.

The titanium oxide fine particles coated with the oxides (the coated titanium oxide fine particles) have an average primary particle diameter of not less than 0.15 μm and not more than 0.25 μm. Preferably, the upper limit of the average primary particle diameter is 0.21 μm. An average primary particle diameter falling within the above-defined range is advantageous in that the storage stability of the white pigment in the ink is excellent, the capability of opacifying a part underlying the ink can be improved, and, further, clogging of a print head with the ink during printing can be effectively prevented. In particular, when the average primary particle diameter falls within the above numerical range, the storage stability and the capability of opacifying the part underlying the ink, which are in a trade-off relationship, can be simultaneously realized. The mass ratio between the titanium oxide fine particles and the oxide is not particularly limited. In general, however, the amount of the oxide is approximately not less than 0.01 part by mass and not more than 30 parts by mass based on 100 parts by mass of the titanium oxide fine particles.

Polysiloxane Coating (Treatment)

In the present invention, the oxide-coated titanium oxide fine particles are further coated with SiH-containing polysiloxane and/or dimethylpolysiloxane. The coverage of the SiH-containing polysiloxane and/or dimethylpolysiloxane based on the titanium oxide fine particles is not less than 0.01% by mass and not more than 2.5% by mass. Preferably, the lower limit of the coverage is 0.01% by mass, and the upper limit of the coverage is 1.0% by mass. A coverage of the SiH-containing polysiloxane and/or dimethylpolysiloxane falling within the above numerical range is advantageous in that the sedimentation of the white pigment in the ink can be suppressed, a satisfactory level of whiteness can be imparted to the ink composition, and the capability of opacifying the part underlying the ink in the printed matter can be improved.

Specific examples of SiH-containing polysiloxanes include methyl hydrogen polysiloxanes represented by general formula (III):

[Chemical formula 1]

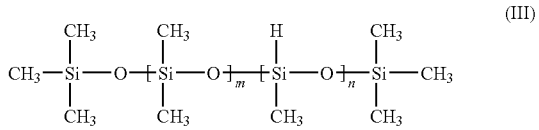

wherein m is an integer of (zero) 0 or more; and n is an integer of 1 or more,
derivatives thereof, and compounds composed mainly of the methyl hydrogen polysiloxanes or the derivatives thereof. Preferred are methyl hydrogen polysiloxanes represented by general formula (I). Among the methyl hydrogen polysiloxanes, compounds represented by formula (III), wherein m+n is an integer of 3 or more and 500 or less, are preferred. More preferred are compounds represented by formula (III) wherein m+n is an integer of 10 or more and 100 or less. When the value of m+n falls within the above-defined range, the white pigment has favorable dispersibility. The methyl hydrogen polysiloxane is available, for example, from Shin-Etsu Chemical Co., Ltd. under the tradename [KF-99], and this product may be used in the present invention.

Specific examples of dimethylpolysiloxanes include straight chain dimethylpolysiloxanes represented by general formula (IV):

[Chemical formula 2]

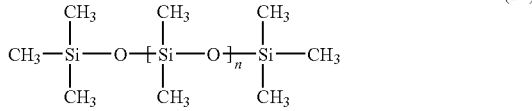

wherein n is an integer of 1 or more;
derivatives thereof; and compounds composed mainly of the dimethylpolysiloxanes or the derivatives. A specific example of the dimethylpolysiloxane is available from Shin-Etsu Chemical Co., Ltd. under the tradename [KF-96], and this product may be used in the present invention.

In the present invention, if necessary, the polysiloxane compound may be used in combination with a silicone oil such as a methylphenyl silicone oil, a polyether-modified silicone oil, an alkyl-modified silicone oil, an amino-modified silicone oil, a mercapto-modified silicone oil, or fluorine-modified silicone oil.

<Glycol Ether Dialkyl Ethers>

Preferred glycol ether dialkyl ethers usable in the present invention include polyoxyethylene glycol dimethyl ethers, polyoxyethylene glycol diethyl ethers, or polyoxyethylene glycol ethyl methyl ethers represented by general formula (I):

$$R^1-(OC_2H_4)_n-OR^2 \quad (I)$$

wherein
$R^1$ and $R^2$ each independently represent a methyl group or an ethyl group; and
n is an integer of 2 to 4.
These glycol ether dialkyl ethers may be used either solely or in a combination of two or more. The glycol ether dialkyl ethers have a high boiling point and a low vapor pressure and thus have an excellent work environmental property. The amount of the glycol ether dialkyl ether compound added is not less than 5% by mass and not more than 100% by mass based on 100% by mass of the total amount of the solvent in the ink composition. Preferably, the lower limit of the addition amount of the glycol ether dialkyl ether compound is 10% by mass, and the upper limit of the addition amount of the glycol ether dialkyl ether compound is 100% by mass.

<Acrylic Resin>

A specific example of the acrylic resin used in the present invention is a product obtained by solution polymerization using a radical polymerization initiator in a glycol ether dialkyl ether compound solvent or a cyclic ester compound solvent.

The glycol ether dialkyl ether compound solvent may be the same as described above. Examples of preferred solvents of cyclic ester compounds are represented by general formula (II):

wherein
$X^1$ and $X^2$ each independently represent a hydrogen atom, alkyl group, or alkenyl group; and
m is an integer of 1 to 3.

The acrylic resin produced by the solution polymerization is highly compatible with the glycol ether dialkyl ether compound, and, thus, a mixed solution composed of the acrylic resin and the glycol ether dialkyl ether compound can easily be prepared. Preferably, the acrylic resin is produced from a radical polymerizable monomer selected from the group consisting of vinyl aromatic compounds, alkyl methacrylates, aralkyl methacrylates, alkoxyalkyl methacrylates, hydroxyalkyl methacrylates, methacrylic acid, dialkylaminoalkyl methacrylates. Various monomers, which have at least one radical polymerizable ethylenic double bond in their molecule and are polymerizable in the co-presence of a radical polymerization initiator in the solvent, may be used as the radical polymerizable monomer.

Specific examples of such radical polymerizable monomers include 1) styrene;
2) α-, o-, p-alkyl, nitro, cyano, amide, and ester derivatives of styrene;
3) (meth)acrylic acid and (meth)acrylic esters, for example, methyl (meth)acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, anthracenyl (meth)acrylate, anthraninonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth)acrylate, glycidyl (meth)acrylate, glycidyl ether 4-hydroxybutyl (meth)acrylate, 3,4-epoxycyclohexylmethyl (meth)acrylate, 3,4-epoxycyclohexylethyl (meth)acrylate, 1,1,1-trifluoroethyl (meth)acrylate, perfluoroethyl (meth)acrylate, perfluoro-n-propyl (meth)acrylate, perfluoro-isopropyl (meth)acrylate, heptadecafluorodecyl (meth)acrylate, triphenylmethyl (meth)acrylate, cumyl (meth)acrylate, 3-(N, N-dimethylamino)propyl (meth)acrylate, 2-hydroxyethyl (meth)acrylate, 2-hydroxypropyl (meth)acrylate, 2,3-dihydroxypropyl (meth)acrylate, 4-hydroxybutyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropylmethyldiethoxysilane, and 3-methacryloxypropylmethyldimethoxysilane;

4) (meth)acrylic acid amide such as (meth)acrylic acid amide, (meth)acrylic acid N,N-dimethylamide, (meth)acrylic acid N,N-diethylamide, (meth)acrylic acid N,N-dipropylamide, (meth)acrylic acid N,N-di-iso-propylamide, (meth)acrylic acid butylamide, (meth)acrylic acid stearylamide, (meth)acrylic acid cyclohexylamide, (meth)acrylic acid phenylamide, (meth)acrylic acid benzylamide, and (meth)acrylic acid anthracenylamide;

5) vinyl compounds such as (meth)acrylic acid anilide, (meth)acryloylnitrile, acrolein, vinyl chloride, vinylidene chloride, vinyl fluoride, vinylidene fluoride, N-vinylpyrrolidone, vinylpyridine, N-vinylcarbazole, vinylimidazole, vinyl acetate, and maleic acid;

6) monomaleimides such as N-benzylmaleimide, N-phenylmaleimide, N-cyclohexylmaleimide, N-laurinmaleimide, and N-(4-hydroxyphenyl)maleimide; and 7) phthalimides such as N-(meth)acryloylphthalimide.

The term "(meth)acryl" as used herein refers to both "acryl" and "methacryl." Some of these monomers are available, for example, from MITSUBISHI RAYON CO., LTD., NOF CORPORATION, Mitsubishi Chemical Corporation, and Hitachi Chemical Company, Ltd.

In the present invention, one of or a combination of two or more of the exemplified radical polymerizable monomers may also be used. If necessary, other monomers copolymerizable with the radical polymerizable monomer may be used in combination with the radical polymerizable monomer. Accordingly, polymer compositions produced according to the present invention include homopolymers and copolymers of the radical polymerizable monomers, and copolymers thereof with other monomers. In the present invention, a particularly preferred copolymer is a copolymer of 100% by mass of methyl methacrylate with 0.01 to 15% by mass of methacrylic acid.

The molecular weight and the glass transition temperature (Tg) of the acrylic resin are not particularly limited. In the present invention, the weight average molecular weight of the acrylic resin is not less than 500 and not more than 150000. The lower limit of the weight average molecular weight of the acrylic resin according to the present invention is preferably 5000, more preferably 8000. The upper limit of the weight average molecular weight of the acrylic resin is preferably 50000, more preferably 40000. The glass transition temperature (Tg) of the acrylic resin is preferably 60° C. or above, particularly preferably 80° C. or above. When the weight average molecular weight or Tg falls within the above-defined range, the effect of providing a printed matter having good properties such as good ink storage stability, drying properties, and opacifying properties is particularly significant.

<Radical Polymerization Initiator>

Radical polymerization initiators usable herein include hydroperoxide-type, dialkylperoxide-type, peroxyester-type, diacylperoxide-type, peroxycarbonate-type, peroxyketal-type, and ketone peroxide-type organic peroxides. Preferred are dialkylperoxide-type, peroxyester-type, and diacylperoxide-type organic peroxides. In the present invention, one of or a combination of two or more of these radical polymerization initiators may also be used.

The following compounds may be mentioned as specific examples of such radical polymerization initiators. Among the following compounds, "*" attached at the right shoulder of the compound name indicates that the compound is particularly preferred in the present invention:

(1) hydroperoxides, for example, t-butyl hydroperoxide*, 1,1,3,3-tetramethylbutyl hydroperoxide*, p-menthane hydroperoxide, cumene hydroperoxide*, and diisopropylbenzene hydroperoxide;

(2) dialkylperoxides, for example, di-t-butyl peroxide*, di-t-hexyl peroxide*, t-butyl cumyl peroxide, dicumyl peroxide, 2,5-dimethyl-2,5-di(t-butyl peroxy)hexane, 2,5-dimethyl-2,5-di(t-butyl peroxy)hexyne-3, and di(2-t-butyl peroxyisopropyl)benzene;

(3) peroxyesters, for example, 1,1,3,3-tetramethylbutyl peroxyneodecanoate*, α-cumyl peroxyneodecanoate*, t-butyl peroxyneodecanoate*, t-hexyl peroxyneodecanoate*, 1-cyclohexyl-1-methylethyl peroxyneodecanoate*, t-butyl peroxyneoheptanoate, t-hexyl peroxypivalate, t-butyl peroxypivalate*, 1,1,3,3-tetramethylbutyl peroxy-2-ethylhexanoate*, t-amyl peroxy-2-ethylhexanoate, t-butyl peroxy-2-ethylhexanoate*, t-hexyl peroxy-2-ethylhexanoate*, t-butyl peroxy-2-ethylhexyl monocarbonate*, t-amyl peroxy-3,5,5-trimethylhexanoate, t-butyl peroxy-3,5,5-trimethylhexanoate*, t-butyl peroxyacetate*, t-butyl peroxyisobutyrate*, t-butyl peroxybenzoate*, t-butyl peroxy-3-methylbenzoate*, t-hexyl peroxybenzoate*, di-t-butyl peroxytrimethyladipate, di-t-butyl peroxyhexahydroterephthalate, t-butyl peroxymaleate, t-butyl peroxylaurate*, t-butyl peroxyisopropyl monocarbonate*, t-hexyl peroxyisopropyl monocarbonate*, 2,5-dimethyl-2,5-di(2-ethylhexanoylperoxy)hexane*, 2,5-dimethyl-2,5-di(3-methylbenzoylperoxy)hexane*, and 2,5-dimethyl-2,5-di(benzoylperoxy)hexane*;

(4) diacylperoxides, for example, diisobutyryl peroxide, di(3,5,5-trimethylhexanoyl)peroxide*, dilauroyl peroxide*, dibenzoyl peroxide*, di-n-octanoyl peroxide, distearoyl peroxide*, disuccinic acid peroxide*, and di(4-methylbenzoyl)peroxide;

(5) peroxycarbonates, for example, di(2-ethoxyethyl)peroxydicarbonate, di-n-propyl peroxydicarbonate, diisopropyl peroxydicarbonate, t-butyl peroxyisopropylcarbonate, 1,6-bis(t-butyl peroxycarbonyloxy)hexane, di(3-methoxybutyl) peroxydicarbonate, di-sec-butyl peroxydicarbonate, t-butylperoxy-2-ethylhexylcarbonate, di(2-ethylhexyl) peroxydicarbonate, di-1-methylheptyl peroxydicarbonate, and di(4-t-butylcyclohexyl)peroxydicarbonate*;

(6) peroxyketals, for example, 2,2-di(4,4-di-t-butyl peroxycyclohexyl)propane, 2,2-di(t-butylperoxy)butane*, 1,1-di(t-butylperoxy)cyclohexane*, 1,1-di(t-butylperoxy)-2-methylcyclohexane*, 14-di(t-butylperoxy)-3,3,5-trimethylcyclohexane, 1,1-di(t-hexylperoxy)cyclohexane*, 1,1-di(t-hexylperoxy)-3,3,5-trimethylcyclohexane*, and n-butyl 4,4-di(t-butyl peroxy)valerate*; and (7) ketone peroxides, for example, acetylacetone peroxide, cyclohexanone peroxide, and methylcyclohexanone peroxide.

<Polymeric Dispersant>

The polymeric dispersant usable in the present invention is an amine salt of an acrylic copolymer having a weight average molecular weight of not less than 30000 and not more than 60000. This polymeric dispersant is available, for example, from BYK Japan K.K. under the tradename "Disperbyk (registered trademark)-2050" and may be used in the present invention.

<Cyclic Ester Compound Solvent>

Specific examples of cyclic ester compound solvents usable in the present invention include γ-lactones having a five-membered ring structure, δ-lactones having a six-membered ring structure, and ε-lactones having a seven-membered ring structure, and examples thereof include γ-butyrolactone, γ-valerolactone, γ-caprolactone, γ-caprylolactone, γ-laurolactone, δ-valerolactone, δ-hexylactone, δ-heptalactone, and ε-caprolactone. They may be used either solely or as a mixture of two or more. In a preferred embodiment of the present invention, the cyclic ester compound solvent is a γ-lactone compound having a five-membered ring. In a further preferred embodiment, the cyclic ester compound solvent is γ-butyrolactone or γ-valerolactone. The use of the cyclic ester compound solvent can further improve the quality of printing on a base material of polyvinyl chloride.

<Other Ingredients>

In addition to the above indispensable ingredients, if necessary, other ingredients may be contained in the oil-based white ink composition for ink jet recording according to the present invention. Other ingredients include, for example, dispersants and surfactants.

Preferably, the dispersant effectively acts when the solubility parameter of the organic solvent is 8 to 11. The content of the dispersant is not less than 5% by weight and not more than 200% by weight based on the content of the white pigment in the ink composition. Preferably, the lower limit of the dispersant content is 30% by weight, and the upper limit of the dispersant content is 120% by weight. The dispersant may be properly selected. Specific examples of such dispersants include polyester-type polymer compounds such as HINOAKUTO KF1-M, T-6000, T-7000, T-8000, T-8350P, and T-8000EL (manufactured by Takefu Fine Chemical Co., Ltd.); Solsperse 20000, 24000, 32000, 32500, 33500, 34000, and 35200 (manufactured by The Lubrizol Corporation); Disperbyk-161, 162, 163, 164, 166, 180, 190, 191, and 192 (manufactured by BYK KK); FUROREN DOPA-17, 22, 23, and G-700 (manufactured by KYOEISHA CHEMICAL Co., LTD); Ajisper PB 821 and PB711 (manufactured by Ajinomoto Fine-Techno Co., Inc.); and LP4010, LP4050, LP4055, and POLYMER 400, 401, 402, 403, 450, 451, and 453 (manufactured by EFKA CHEMICALS B.V.). They may be used either solely or as a mixture of two or more.

Further, in the present invention, if necessary, for example, stabilizers such as antioxidants and ultraviolet absorbers and surfactants may be added. Preferred antioxidants include BHA (2,3-dibutyl-4-oxyanisole) and BHT (2,6-di-t-butyl-p-cresol). The addition amount thereof is preferably not less than 0.01% by mass and not more than 3.00% by mass based on the total amount of the ink composition. Ultraviolet absorbers include benzophenone compounds and benzotriazole compounds. The amount of the ultraviolet absorber added is preferably not less than 0.01% by mass and not more than 0.5% by mass based on the total amount of the ink composition. Any of anionic, cationic, amphoteric or non-ionic surfactants may be used as the surfactant. The amount of the surfactant added is preferably not less than 0.5% by mass and not more than 4.0% by mass based on the total amount of the ink composition.

II. Properties and Use of Ink Composition

Preferably, the ink composition according to the present invention is prepared so that the ink composition has a viscosity at 20° C. of not less than 2 mPa·s and not more than 10 mPa·s and, preferably, the lower limit and upper limit of the viscosity are 3 mPa·s and 5 mPa·s, respectively. In this case, the surface tension of the ink composition is preferably not less than 20 mN/m and not more than 50 mN/m. When the surface tension falls within the above-defined range, the wettability of the surface of a print head for ink jet recording by the ink composition can be regulated. In this case, ink droplets can easily be ejected, and the wettability of the surface of the printed recording medium can be regulated, whereby good printing can be realized.

The ink composition according to the present invention is advantageously inert to the surface of the ejection nozzle subjected to treatment for rendering the nozzle repellent to the ink and thus can be advantageously used in an ink jet recording method in which ink is ejected from a printer head, for ink jet recording, having an ejection nozzle surface subjected to the treatment for rendering the ejection nozzle surface repellent to the ink.

The ink composition according to the present invention may be used with any type of recording media without particular limitation. However, when the base material is formed of, for example, a plastic, particularly a hard or soft polyvinyl chloride, the effect of the present invention is particularly significant. Examples of polyvinyl chloride base materials include polyvinyl chloride films and sheets. The ink composition according to the present invention can realize printing on a non-treated surface of a polyvinyl chloride base material, which could not have been realized by the conventional oil-based ink composition, and can eliminate the need to use an expensive recording medium such as a conventional recording medium having a receptive layer. It is a matter of course that the ink composition according to the present invention has also an excellent printability on recording media subjected to surface treatment with an ink-receptive resin.

III. Production Process of Ink Composition

According to another aspect of the present invention, there is provided a process for producing an oil-based white ink composition for ink jet recording, comprising mixing a white pigment;

the white pigment being formed of titanium oxide fine particles having an average particle diameter of not less than 0.15 μm and not more than 0.25 μm and coated with at least one of aluminum oxide and silicon oxide, the white pigment being further coated with not less than 0.01% by mass and not more than 2.5% by mass of at least one of an SiH-containing polysiloxane and dimethylpolysiloxane;

a glycol ether dialkyl ether compound solvent;

a polymeric dispersant; and an acrylic resin produced by a solution polymerization using a radical polymerization initiator in a glycol ether dialkyl ether compound solvent or a cyclic ester compound solvent.

The materials used in the production process, addition amount thereof and the like may be the same as described above in the column of "I. ink composition," and properties and the like of the ink composition produced may be the same as described in the column of "II. Properties and use of ink composition."

In the process according to the present invention, the mixing can be achieved by homogeneously mixing the above ingredients by a conventional method. The mixing may be carried out, for example, by dispersing the above ingredients with zirconia beads of 0.8 mmφ in a paint shaker for one hr and then further dispersing the dispersion with zirconia beads of 0.3 mmφ in a paint shaker for 5 hr to regulate the viscosity of the ink to 4.0 to 4.5 mPa·s. The viscosity is a value measured with a falling ball-type viscosimeter (AMVn, manufactured by NIHON SIBERHEGNER K.K.). Printing of the ink composition on conventional recording materials may be carried out with a commercially available ink jet printer.

The ingredients may be mixed in any order by any method. The mixing order and the mixing method may be determined by taking into consideration, for example, properties of the mixture in each stage of the production process and easiness of the production. For example, the ingredients each independently may be mixed one type by one type, or alternatively the supply and mixing of the ingredients may be simultaneously carried out to produce a mixture of the ingredients in one stage. Further, a method may also be adopted in which two or at least three types of ingredients are previously mixed together and the mixture is then mixed with the remaining other ingredients. In this case, when the two or at least three types of ingredients are previously mixed, the amount of each ingredient to be previously mixed may be the whole amount of the ingredient, or alternatively may be a part of the necessary amount of the ingredient.

Second Aspect of Present Invention

I. Oil-Based White Ink Composition for Ink Jet Recording

<White Pigment>

In the second aspect of the present invention, the details of the white pigment may be the same as described in the first aspect of the present invention except for matters which will be described below. Accordingly, the details of titanium oxide fine particle, oxide coating (treatment), and polysiloxane coating (treatment) may be the same as described in respective columns of these matters in the first aspect of the present invention except for matters which will be described below.

In the second aspect of the present invention, the amount of the white pigment added to the ink composition is not less than 5% by mass and not more than 30% by mass based on the whole amount of the ink composition. Preferably, the lower limit of the addition amount of the white pigment is 10% by mass, and the upper limit of the addition amount of the white pigment is 25% by mass.

Polysiloxane Coating (Treatment)

In the second aspect of the present invention, the coverage of SiH-containing polysiloxane and/or dimethylpolysiloxane on the titanium oxide fine particles is not less than 0.01% by mass and not more than 0.5% by mass. Preferably, the upper limit of the coverage is 0.4% by mass.

<Acrylic Resin>

In the second aspect of the present invention, the details of the acrylic resin may be the same as described in the first aspect of the present invention except for matters which will be described below. In the second aspect of the present invention, the copolymer particularly preferably comprises 100% by mass of methyl methacrylate and not less than 0.01% by mass and not more than 15% by mass of maleic acid.

<Acrylic Copolymer-Containing Dispersant>

In the second aspect of the present invention, the acrylic copolymer-containing dispersant is a block copolymer having a skeleton part containing a pigment affinity group and an acrylic resin skeleton. The acrylic copolymer-containing dispersant usable in the present invention is available, for example, from BYK Japan K.K. under the tradename "Disperbyk (registered trademark)-2020."

<Glycol Ether Dialkyl Ether Compounds>, <Radical Polymerization Initiator>, <Cyclic Ester Compound Solvent>, and <Other Ingredients>

In the second aspect of present invention, the details of glycol ether dialkyl ether compounds, radical polymerization initiator, cyclic ester compound solvents, and other ingredients may be the same as described in the first aspect of the present invention.

II. Properties and Use of Ink Composition

In the second aspect of the present invention, the details of properties and use of the ink composition may be the same as described in the column of "II. Properties and use of ink composition" in the first aspect of the present invention.

III. Production Process of Ink Composition

According to the second aspect of the present invention, there is provided a process for producing an oil-based white ink composition for ink jet recording, comprising mixing
  a white pigment;
  the white pigment being formed of titanium oxide fine particles having an average particle diameter of not less than 0.15 μm and not more than 0.25 μm and coated with at least one of aluminum oxide and silicon oxide, the white pigment being further coated with not less than 0.01% by mass and not more than 0.50% by mass of at least one of an SiH-containing polysiloxane and dimethylpolysiloxane;
  a glycol ether dialkyl ether compound solvent;
  an acrylic copolymer-containing dispersant; and
  an acrylic resin produced by a solution polymerization using a radical polymerization initiator in a glycol ether dialkyl ether compound solvent or a cyclic ester compound solvent.

The details of the production process of an ink composition according to the second aspect of the present invention may be the same as described in "III. Production process of ink composition" in the first aspect of the present invention except for the above matter.

EXAMPLES

The present invention is further illustrated by Examples that are not intended as a limitation of the present invention.

First Aspect of Invention

Synthesis of Polymer A

Polymers A1 to A7 were produced by the following process. A sample prepared by purifying only a resin from a resin solution with hexane was used for the analysis of the polymers thus obtained. For the polymers, the molecular weight was measured by gel permeation chromatography (GPC) with "HLC-8220GPC" manufactured by TOSOH CORPORATION using polystyrene as a standard. Further, the glass transition temperature (Tg) was measured by differential scanning calorimetry with "DSC-50" manufactured by SHIMADZU CORPORATION.

Polymer A1

A mixture of 198 g of methyl methacrylate, 2 g of methacrylic acid, and 8 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100°

C. for 2 hr. The reaction solution was then cooled to give a colorless and transparent solution of a copolymer of methyl methacrylate with methacrylic acid. Polymer A1 had a Tg value of 105° C. and had a weight average molecular weight of 20000.

Polymer A2

A mixture of 199 g of methyl methacrylate, 1 g of methacrylic acid, and 8 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer of methyl methacrylate with methacrylic acid. Polymer A2 had a Tg value of 105° C. and had a weight average molecular weight of 20000.

Polymer A3

A mixture of 198 g of methyl methacrylate, 2 g of methacrylic acid, and 10 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer of methyl methacrylate with methacrylic acid. Polymer A3 had a Tg value of 105° C. and had a weight average molecular weight of 15000.

Polymer A4

A mixture of 198 g of methyl methacrylate, 2 g of methacrylic acid, and 10 g of t-butylperoxy-2-ethylhexanoate was added dropwise to 300 g of γ-butyrolactone kept at 100° C. over a period of 1.5 hr. After the completion of dropwise addition, a reaction was allowed to proceed at 100° C. for 2 hr. The reaction solution was then cooled to give a colorless and transparent solution of a copolymer of methyl methacrylate with methacrylic acid. Polymer A4 had a Tg value of 105° C. and had a weight average molecular weight of 15000.

Polymer A5

A mixture of 198 g of methyl methacrylate, 2 g of methacrylic acid, and 10 g of t-butylperoxy-2-ethylhexanoate was added dropwise to 300 g of toluene kept at 100° C. over a period of 1.5 hr. After the completion of dropwise addition, a reaction was allowed to proceed at 100° C. for 2 hr. The reaction solution was then cooled to give a colorless and transparent solution of a copolymer of methyl methacrylate with methacrylic acid. Polymer A5 had a Tg value of 105° C. and had a weight average molecular weight of 15000.

Polymer A6

A mixture of 198 g of methyl methacrylate, 2 g of methacrylic acid, and 3 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a polymer of methyl methacrylate. Polymer A6 had a Tg value of 105° C. and had a weight average molecular weight of 60000.

Polymer A7

A mixture of 198 g of methyl methacrylate, 2 g of methacrylic acid, and 30 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a polymer of methyl methacrylate. Polymer A7 had a Tg value of 105° C. and had a weight average molecular weight of 3000.

Example A1

The following ingredients were homogeneously mixed together and were dispersed in each other according to the following formulation to give an ink of Example A1 having a viscosity of 4.0 to 4.5 mPa·s.

| | |
|---|---|
| White pigment (Prepared by providing titanium dioxide, which has an average primary particle diameter of 0.21 μm and has been subjected to surface treatment with alumina, and further treating the titanium dioxide with 0.50% by mass of methyl hydrogen polysiloxane (methyl hydrogen polysiloxane KF-99, manufactured by Shin-Etsu Chemical Co., Ltd.)). | 6 parts by mass |
| Mixed solvent | |
| Diethylene glycol diethyl ether | 59 parts by mass |
| γ-Butyrolactone | 30 parts by mass |
| Polymer A1 | 3 parts by mass |
| Polymer dispersant (Manufactured by BYK Japan K.K., Disperbyk-2050, weight average molecular weight 50000) | 2 parts by mass |

Example A2

An ink of Example A2 was produced in the same manner as in Example A1, except that the white pigment used in Example A1 was changed to a white pigment prepared by providing titanium dioxide, which has an average primary particle diameter of 0.21 μm and has been subjected to surface treatment with alumina, and further treating the titanium dioxide with 0.75% by mass of methyl hydrogen polysiloxane (methyl hydrogen polysiloxane KF-99, manufactured by Shin-Etsu Chemical Co., Ltd.).

Example A3

An ink of Example A3 was produced in the same manner as in Example A2, except that polymer A2 was used instead of polymer A1 used in Example A2.

Example A4

An ink of Example A4 was produced in the same manner as in Example A2, except that polymer A3 was used instead of polymer A1 used in Example A2.

Example A5

An ink of Example A5 was produced in the same manner as in Example A2, except that polymer A4 was used instead of polymer A1 used in Example A2.

Comparative Example A1

An ink of Comparative Example A1 was produced in the same manner as in Example A1, except that the white pigment used in Example A1 was changed to a white pigment of titanium dioxide that has an average primary particle diameter of 0.21 μm and has been subjected to surface treatment with alumina but has not been further treated with methyl hydrogen polysiloxane (methyl hydrogen polysiloxane KF-99, manufactured by Shin-Etsu Chemical Co., Ltd.).

Comparative Example A2

An ink of Comparative Example A2 was produced in the same manner as in Example A1, except that the white pigment used in Example A1 was changed to a white pigment prepared by providing titanium dioxide, which has an average primary particle diameter of 0.21 μm and has been subjected to surface treatment with alumina, and further treating the titanium dioxide with 3.0% by mass of methyl hydrogen polysiloxane (methyl hydrogen polysiloxane KF-99, manufactured by Shin-Etsu Chemical Co., Ltd.).

Comparative Example A3

An ink of Comparative Example A3 was produced in the same manner as in Example A1, except that "Paraloid B99N" manufactured by Rohm and Haas Japan K.K. was used instead of polymer A2 used in Example A2.

Comparative Example A4

An ink of Comparative Example A4 was produced in the same manner as in Example A1, except that "Paraloid B60" manufactured by Rohm and Haas Japan K.K. was used instead of polymer A2 used in Example A2.

Comparative Example A5

An ink of Comparative Example A5 was produced in the same manner as in Example A1, except that polymer A5 was used instead of polymer A2 used in Example A2.

Comparative Example A6

An ink of Comparative Example A6 was produced in the same manner as in Example A1, except that polymer A6 was used instead of polymer A2 used in Example A2.

Comparative Example A7

An ink of Comparative Example A7 was produced in the same manner as in Example A1, except that polymer A7 was used instead of polymer A2 used in Example A2.

Evaluation Test A

The following evaluation was performed using the inks produced in Examples A1 to A5 and Comparative Examples A1 to A7. In the evaluation of printed matters, each ink was filled into an ink jet printer (tradename: MJ-8000C, manufactured by SEIKO EPSON CORPORATION), and printing was performed followed by the following evaluation tests. The results were as shown in Table 1 below.

Evaluation 1: Covering Property Evaluation Test

A blotted image was printed on a transparent polyvinyl chloride film with the above printer. For the printed matter, the light transmission density was measured with a Macbeth densimeter (TD-904, manufactured by Macbeth Corporation), and the results were evaluated according to the following evaluation criteria.

Evaluation Criteria

Evaluation A: The printed matter had a light transmission density of not less than 0.20 and an excellent covering property.

Evaluation B: The printed matter had a light transmission density of less than 0.20 and a poor covering property.

Evaluation 2: Resolubility Test

Each ink (1 g) was placed in a petri dish, and the petri dish was allowed to stand at 40° C. for 3 days. The ink was again dropped onto the dried and solidified ink to examine resolubility (redispersibility). The results were evaluated according to the following evaluation criteria.

Evaluation Criteria

Evaluation A: Redissolved.

Evaluation B: Partially redissolved.

Evaluation C: Not redissolved.

Evaluation 3: Sedimentation Test

Each ink was placed in a transparent glass bottle, and the bottle was allowed to stand for one month. The ink was then visually inspected for sedimentation. The results were evaluated according to the following evaluation criteria.

Evaluation Criteria

Evaluation A: The sedimentation of pigment did not occur.

Evaluation B: The sedimentation of pigment occurred, but the sediment disappeared upon shaking of the ink.

Evaluation C: The sedimentation of the pigment occurred, and the sediment did not disappear even after shaking of the ink.

Evaluation 4: Ejection Stability Test

Each ink was continuously printed for one hr. The printing was then stopped, the printer was allowed to stand for one hr, and the printing was then again performed. In this case, ejected droplet trajectory directionality and dropouts were visually inspected for the printed matters. The results were evaluated according to the following evaluation criteria.

Evaluation Criteria

Evaluation A: Neither ejected droplet trajectory directionality problem nor dropout problem occurred.

Evaluation B: Ejected droplet trajectory directionality problem and/or dropout problem occurred.

Evaluation 5: Ejection Stability Test after Standing for Long Period of Time

Each ink was continuously printed for one hr. The printing was then stopped, the printer was allowed to stand for two weeks, and the printing was then again performed. In this case, ejected droplet trajectory directionality and dropouts were visually inspected for the printed matters. The results were evaluated according to the following evaluation criteria.

Evaluation Criteria

Evaluation A: Neither ejected droplet trajectory directionality problem nor dropout problem occurred.

Evaluation B: Ejected droplet trajectory directionality problem and/or dropout problem occurred.

[Table 1]

TABLE 1

| Ink | Evaluation | | | | |
|---|---|---|---|---|---|
| | Evaluation 1 | Evaluation 2 | Evaluation 3 | Evaluation 4 | Evaluation 5 |
| Ex. A1 | A | A | A | A | A |
| Ex. A2 | A | A | A | A | A |
| Ex. A3 | A | A | A | A | A |
| Ex. A4 | A | A | A | A | A |
| Ex. A5 | A | A | A | A | A |
| Comp. Ex. A1 | B | C | B | B | B |
| Comp. Ex. A2 | B | B | B | B | B |
| Comp. Ex. A3 | B | C | B | B | B |
| Comp. Ex. A4 | B | C | B | B | B |
| Comp. Ex. A5 | B | C | C | B | B |
| Comp. Ex. A6 | A | C | B | B | B |
| Comp. Ex. A7 | B | A | B | A | A |

The evaluation results demonstrate that the ink compositions according to the present invention, even when they were allowed to stand under the above condition for a long period of time, did not cause pigment sedimentation, were highly stable over time, had excellent storage stability, had an excellent capability of ink to cover the base material for printing, and had an excellent stability of ink ejection onto the base material.

Second Aspect of Invention

Synthesis of Polymer B

Polymers B1 to B8 were produced by the following process. A sample prepared by purifying only a resin from a resin solution with hexane was used for the analysis of the polymers B (B1 to B8) thus obtained. For the polymers, the molecular weight was measured by gel permeation chromatography (GPC) with "HLC-8220GPC" manufactured by TOSOH CORPORATION using polystyrene as a standard. Further, the glass transition temperature (Tg) was measured by differential scanning calorimetry with "DSC-50" manufactured by SHIMADZU CORPORATION.

Polymer B1

A mixture of 198 g of methyl methacrylate, 2 g of maleic acid, and 8 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B1 had a Tg value of 105° C. and had a weight average molecular weight of 18000.

Polymer B2

A mixture of 199 g of methyl methacrylate, 1 g of maleic acid, and 8 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B2 had a Tg value of 105° C. and had a weight average molecular weight of 18000.

Polymer B3

A mixture of 198 g of methyl methacrylate, 2 g of maleic acid, and 10 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B3 had a Tg value of 105° C. and had a weight average molecular weight of 15000.

Polymer B4

A mixture of 198 g of methyl methacrylate, 2 g of maleic acid, and 15 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B4 had a Tg value of 105° C. and had a weight average molecular weight of 10000.

Polymer B5

A mixture of 198 g of methyl methacrylate, 2 g of maleic acid, and 8 g of t-butylperoxy-2-ethylhexanoate was added dropwise to 300 g of γ-butyrolactone kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B5 had a Tg value of 105° C. and, had a weight average molecular weight of 18000.

Polymer B6

A mixture of 198 g of methyl methacrylate, 2 g of maleic acid, and 8 g of t-butylperoxy-2-ethylhexanoate was added dropwise to 300 g of toluene kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B6 had a Tg value of 105° C. and had a weight average molecular weight of 18000.

Polymer B7

A mixture of 198 g of methyl methacrylate, 2 g of maleic acid, and 3 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B7 had a Tg value of 105° C. and had a weight average molecular weight of 60000.

Polymer B8

A mixture of 198 g of methyl methacrylate, 2 g of maleic acid, and 30 g of t-butylperoxy-2-ethylhexanoate was added dropwise to 300 g of diethylene glycol diethyl ether kept at 100° C. over a period of 1.5 hr. After the completion of dropwise addition, a reaction was allowed to proceed at 100° C. for 2 hr. The reaction solution was then cooled to give a colorless and transparent solution of a copolymer B of methyl methacrylate with maleic acid. Polymer B8 had a Tg value of 105° C. and had a weight average molecular weight of 3000.

Example B1

The following ingredients were homogeneously mixed together and were dispersed in each other according to the following formulation to give an ink of Example B1 having a viscosity of 4.0 to 4.5 mPa·s.

| | |
|---|---|
| White pigment | 12 parts by mass |
| (Prepared by providing titanium dioxide, which has an average primary particle diameter of 0.21 μm and has been subjected to surface treatment with alumina, and further treating the titanium dioxide with 0.12% by mass of methyl hydrogen polysiloxane (methyl hydrogen polysiloxane KF-99, manufactured by Shin-Etsu Chemical Co., Ltd.)). | |
| Mixed solvent | |
| Diethylene glycol diethyl ether | 51.3 parts by mass |
| γ-Butyrolactone | 30.0 parts by mass |
| Polymer B1 | 4.6 parts by mass |
| Acrylic copolymer-containing dispersant | 2.1 parts by mass |
| (Disperbyk-2020, manufactured by BYK Japan KK, weight average molecular weight 12000) | |

Example B2

An ink of Example B2 was produced in the same manner as in Example B1, except that the white pigment used in Example B1 was changed to a white pigment prepared by providing titanium dioxide, which has an average primary particle diameter of 0.21 μm and has been subjected to surface treatment with alumina, and further treating the titanium dioxide with 0.25% by mass of methyl hydrogen polysiloxane (methyl hydrogen polysiloxane KF-99, manufactured by Shin-Etsu Chemical Co., Ltd.).

Example B3

An ink of Example B3 was produced in the same manner as in Example B2, except that polymer B2 was used instead of polymer B1 used in Example B2.

Example B4

An ink of Example B4 was produced in the same manner as in Example B2, except that polymer B3 was used instead of polymer B1 used in Example B2.

Example B5

An ink of Example B5 was produced in the same manner as in Example B2, except that polymer B4 was used instead of polymer B1 used in Example B2.

Example B6

An ink of Example B6 was produced in the same manner as in Example B2, except that polymer B5 was used instead of polymer B1 used in Example B2.

Comparative Example B1

An ink of Comparative Example B1 was produced in the same manner as in Example B1, except that the white pigment used in Example B1 was changed to a white pigment of titanium dioxide that has an average primary particle diameter of 0.21 μm and has been subjected to surface treatment with alumina but has not been further treated with methyl hydrogen polysiloxane (methyl hydrogen polysiloxane KF-99, manufactured by Shin-Etsu Chemical Co., Ltd.).

Comparative Example B2

An ink of Comparative Example B2 was produced in the same manner as in Example B1, except that the white pigment used in Example B1 was changed to a white pigment of titanium dioxide that has an average primary particle diameter of 0.21 μm and has been subjected to surface treatment with alumina, and further treating with 0.75% by mass of methyl hydrogen polysiloxane (methyl hydrogen polysiloxane KF-99, manufactured by Shin-Etsu Chemical Co., Ltd.).

Comparative Example B3

An ink of Comparative Example B3 was produced in the same manner as in Example B1, except that "Paraloid B99N" manufactured by Rohm and Haas Japan K.K. was used instead of polymer B2 used in Example B2.

Comparative Example B4

An ink of Comparative Example B4 was produced in the same manner as in Example B1, except that "Paraloid B60" manufactured by Rohm and Haas Japan K.K. was used instead of polymer B2 used in Example B2.

Comparative Example B5

An ink of Comparative Example B5 was produced in the same manner as in Example B1, except that polymer B6 was used instead of polymer B2 used in Example B2.

Comparative Example B6

An ink of Comparative Example B6 was produced in the same manner as in Example B1, except that polymer B7 was used instead of polymer B2 used in Example B2.

Comparative Example B7

An ink of Comparative Example B7 was produced in the same manner as in Example B1, except that polymer B8 was used instead of polymer B2 used in Example B2.

Evaluation Test B

The following evaluation was performed using the inks produced in Examples B1 to B6 and Comparative Examples B1 to B7. In the evaluation of printed matters, each ink was filled into an ink jet printer (tradename: MJ-8000C, manufactured by SEIKO EPSON CORPORATION), and printing, was performed followed by the following evaluation tests. The results were as shown in Table 1 below.

Evaluation 1: Covering Property Evaluation Test

A blotted image was printed on a transparent polyvinyl chloride film with the above printer. For the printed matter, the light transmission density was measured with a Macbeth densimeter (TD-904, manufactured by Macbeth Corporation), and the results were evaluated according to the following evaluation criteria.

Evaluation Criteria

Evaluation A: The printed matter had a light transmission density of not less than 0.24 and an excellent covering property.

Evaluation B: The printed matter had a light transmission density of less than 0.24 and a poor covering property.

Evaluation 2: Resolubility Test

Each ink (1 g) was placed in a petri dish, and the petri dish was allowed to stand at 40° C. for 3 days. The ink was again dropped onto the dried and solidified ink to examine resolubility (redispersibility). The results were evaluated according to the following evaluation criteria.

Evaluation Criteria

Evaluation A: Redissolved.

Evaluation B: Partially redissolved.

Evaluation C: Not redissolved.

Evaluation 3: Sedimentation Test

Each ink was placed in a transparent glass bottle, and the bottle was allowed to stand for one month. The ink was then visually inspected for sedimentation. The results were evaluated according to the following evaluation criteria.

Evaluation Criteria

Evaluation A: The sedimentation of pigment did not occur.

Evaluation B: The sedimentation of pigment occurred, but the sediment disappeared upon shaking of the ink.

Evaluation C: The sedimentation of the pigment occurred, and the sediment did not disappear even after shaking of the ink.

Evaluation 4: Drying Property Test

For each ink, blotted images were printed, and the time necessary for the printed matter to be dried was measured. The results were evaluated according to the following evaluation criteria.

Evaluation Criteria

Evaluation A: The time necessary for drying was less than 3 min.

Evaluation B: The time necessary for drying was not less than 3 min, indicating that the drying property was poor.

Evaluation 5: Ejection Stability Test

Each ink was continuously printed for one hr. The printing was then stopped, the printer was allowed to stand for one hr, and the printing was then again performed. In this case, ejected droplet trajectory directionality and dropouts were visually inspected for the printed matters. The results were evaluated according to the following evaluation criteria.

Evaluation Criteria

Evaluation A: Neither ejected droplet trajectory directionality problem nor dropout problem occurred.

Evaluation B: Ejected droplet trajectory directionality problem and/or dropout problem occurred.

Each ink was continuously printed, and the state of the printed matter was visually inspected. The results were evaluated according to the above evaluation criteria.

[Table 2]

TABLE 2

| Ink | Evaluation 1 | Evaluation 2 | Evaluation 3 | Evaluation 4 | Evaluation 5 |
|---|---|---|---|---|---|
| Ex. B1 | A | A | A | A | A |
| Ex. B2 | A | A | A | A | A |
| Ex. B3 | A | A | A | A | A |
| Ex. B4 | A | A | A | A | A |
| Ex. B5 | A | A | A | A | A |
| Ex. B6 | A | A | A | A | A |
| Comp. Ex. B1 | B | C | C | A | B |
| Comp. Ex. B2 | B | C | C | A | B |
| Comp. Ex. B3 | B | C | C | B | B |
| Comp. Ex. B4 | B | C | C | B | B |
| Comp. Ex. B5 | A | C | C | A | B |
| Comp. Ex. B6 | A | B | A | A | B |
| Comp. Ex. B7 | B | A | A | B | B |

The evaluation results demonstrate that the ink compositions according to the present invention, even when they were allowed to stand under the above condition for a long period of time, did not cause pigment sedimentation, were highly stable over time, had excellent storage stability, had an excellent capability of ink to cover the base material for printing, and had an excellent stability of ink ejection onto the base material.

The invention claimed is:

1. An oil-based white ink jet recording composition comprising:
    a white pigment formed of titanium oxide fine particles coated with aluminum oxide and/or silicon oxide, wherein the coated titanium oxide fine particles are further coated with not less than 0.01% by mass and not more than 0.50% by mass of an SiH-containing polysiloxane and/or dimethylpolysiloxane;
    a glycol ether dialkyl ether compound solvent;
    an acrylic copolymer-containing dispersant comprising a block copolymer having a skeleton part containing a pigment affinity group and an acrylic resin skeleton; and
    an acrylic resin produced by a solution polymerization using a radical polymerization initiator in a glycol ether dialkyl ether compound solvent or a cyclic ester compound solvent.

2. The ink jet recording composition according to claim 1, wherein the amount of the titanium oxide fine particles in the white pigment added is not less than 5% by mass and not more than 30% by mass based on the total amount of the ink composition.

3. A process for producing an oil-based white ink jet recording composition, comprising:
    mixing a white pigment formed of titanium oxide fine particles coated with aluminum oxide and/or silicon oxide, wherein the coated titanium oxide fine particles are further coated with not less than 0.01% by mass and not more than 0.50% by mass of an SiH-containing polysiloxane and/or dimethylpolysiloxane,
    a glycol ether dialkyl ether compound solvent, an acrylic copolymer-containing dispersant comprising a block copolymer having a skeleton part containing a pigment affinity group d an acrylic resin skeleton, and an acrylic resin produced by a solution polymerization using a radical polymerization initiator in a glycol ether dialkyl ether compound solvent or a cyclic ester compound solvent.

4. The ink jet recording composition according to claim 1, wherein the glycol ether dialkyl ether compound is polyoxyethylene glycol dimethyl ether, polyoxyethylene glycol diethyl ether, or polyoxyethylene glycol ethyl methyl ether represented by general formula (I):

$$R^1—(OC_2H_4)_n—OR^2 \quad (I)$$

wherein

R1 and R2 each independently represent a methyl group or an ethyl group; and n is an integer of 2 to 4.

5. The ink jet recording composition according to claim 1, wherein the acrylic resin is an acrylic resin produced by a solution polymerization using a radical polymerization initiator in a glycol ether dialkyl ether compound solvent or a cyclic ester compound solvent represented by general formula (II):

wherein

X1 and X2 each independently represent a hydrogen atom, alkyl group, or alkenyl group; and m is an integer of 1 to 3.

6. The ink jet recording composition according to claim 1, wherein the acrylic resin has a glass transition temperature (Tg) of 80° C. or above.

7. The ink jet recording composition according to claim 1, wherein the acrylic resin has a weight average molecular weight of not less than 5000 and not more than 50000.

8. The ink jet recording composition according to claim 1, which further comprises a cyclic ester compound solvent.

9. the ink jet recording composition according to claim 1, which further comprises at least one of a dispersant and a surfactant.

10. The ink jet recording composition according to claim 1, wherein the acrylic resin is a copolymer of an alkyl methacrylate with methacrylic acid and/or a copolymer of an alkyl methacrylate with maleic acid.

* * * * *